United States Patent [19]

Abe

[11] Patent Number: 4,713,715
[45] Date of Patent: Dec. 15, 1987

[54] TAPE POSITION DISPLAY APPARATUS USING COUNTER ROLLER PULSES AND CTL PULSES

[75] Inventor: Fumiyoshi Abe, Kanagawa, Japan

[73] Assignee: Sony Corporation, Tokyo, Japan

[21] Appl. No.: 792,850

[22] Filed: Oct. 30, 1985

[30] Foreign Application Priority Data

Oct. 31, 1984 [JP] Japan ................................. 59-229713

[51] Int. Cl.$^4$ .............................................. G11B 15/18
[52] U.S. Cl. .................................................... 360/137
[58] Field of Search ....................... 360/137, 72.1–72.3, 360/90, 71; 242/186, 191

[56] References Cited

U.S. PATENT DOCUMENTS

| | | | |
|---|---|---|---|
| 3,939,490 | 2/1976 | Opelt | 360/70 X |
| 4,062,048 | 12/1977 | Weber | 360/72.3 |
| 4,394,701 | 7/1983 | Igata et al. | 360/137 |
| 4,471,391 | 9/1984 | Reagan | 360/137 X |

Primary Examiner—Stuart N. Hecker
Assistant Examiner—David J. Severin
Attorney, Agent, or Firm—Lewis H. Eslinger; Alvin Sinderbrand

[57] ABSTRACT

A tape position display apparatus including a circuit for generating first electrical pulses in response to transport of a tape, a first counter for counting the first electrical pulses, a circuit for generating second electrical pulses from a control track signal recorded on a tape in response to such transport, a second counter for counting the second electrical pulses, a subtracter for detecting the difference between the first and second counts and producing a difference signal proportional thereto, and a comparator for comparing the difference signal with a predetermined value. The second counter counts in a direction which is controlled by the compared result from the comparator, and the tape position is displayed in response to the difference determined by the subtracter.

5 Claims, 56 Drawing Figures

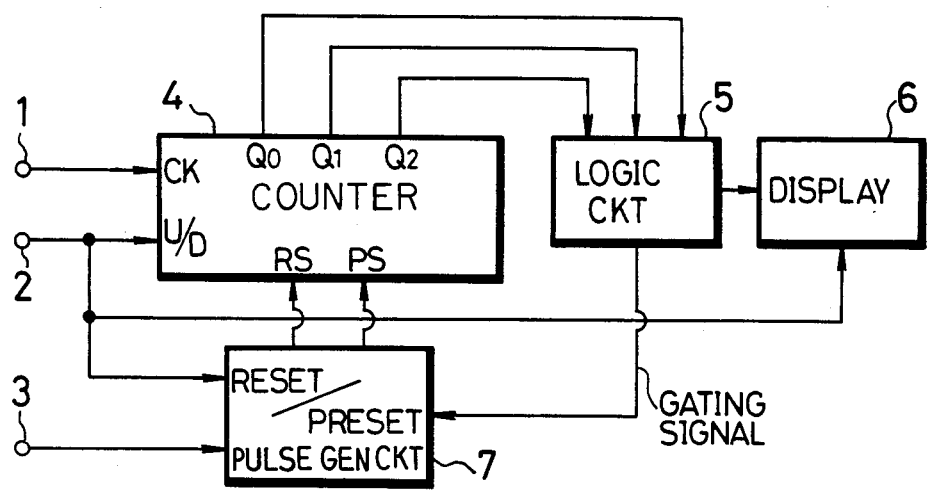

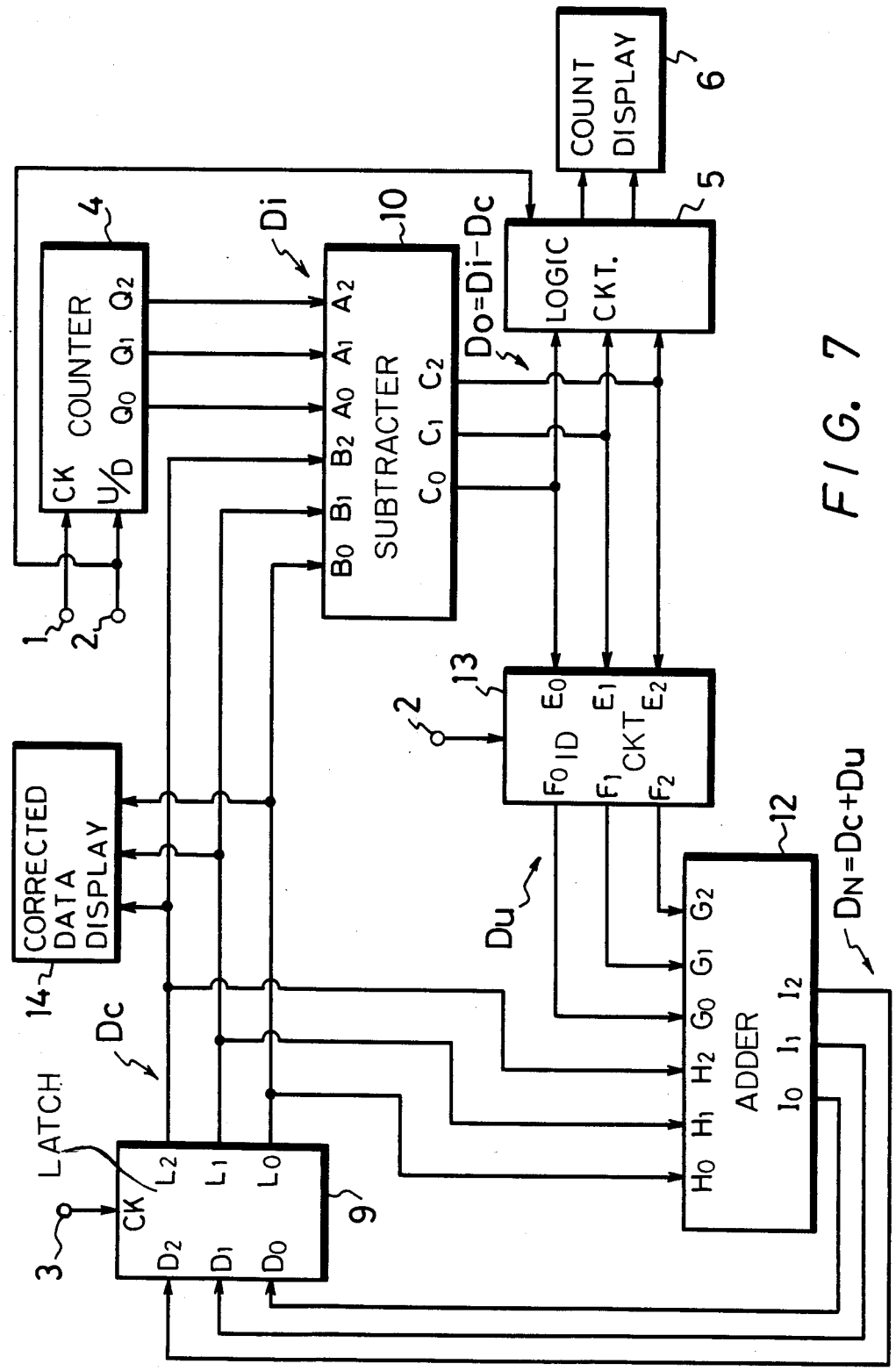
F I G. 7

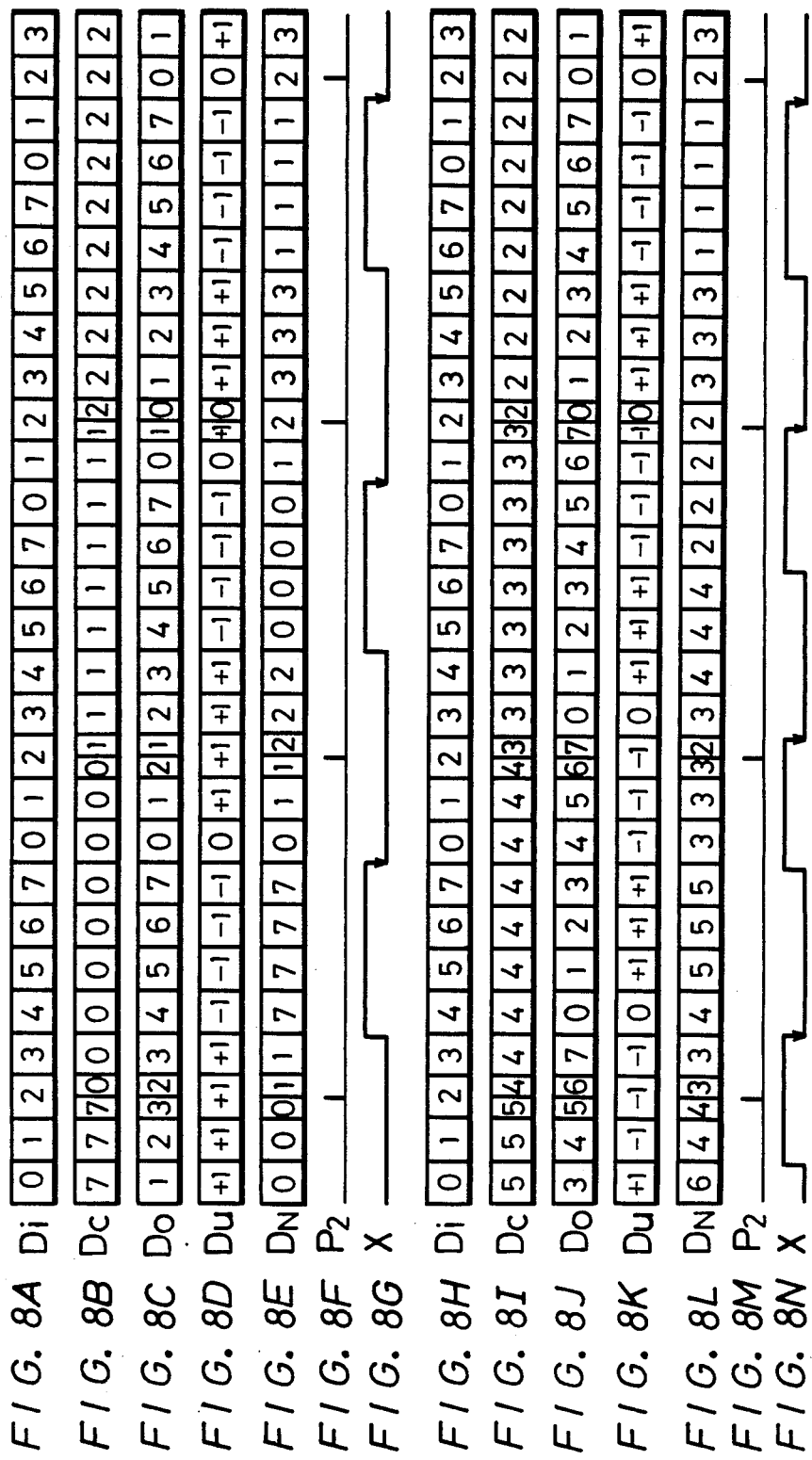

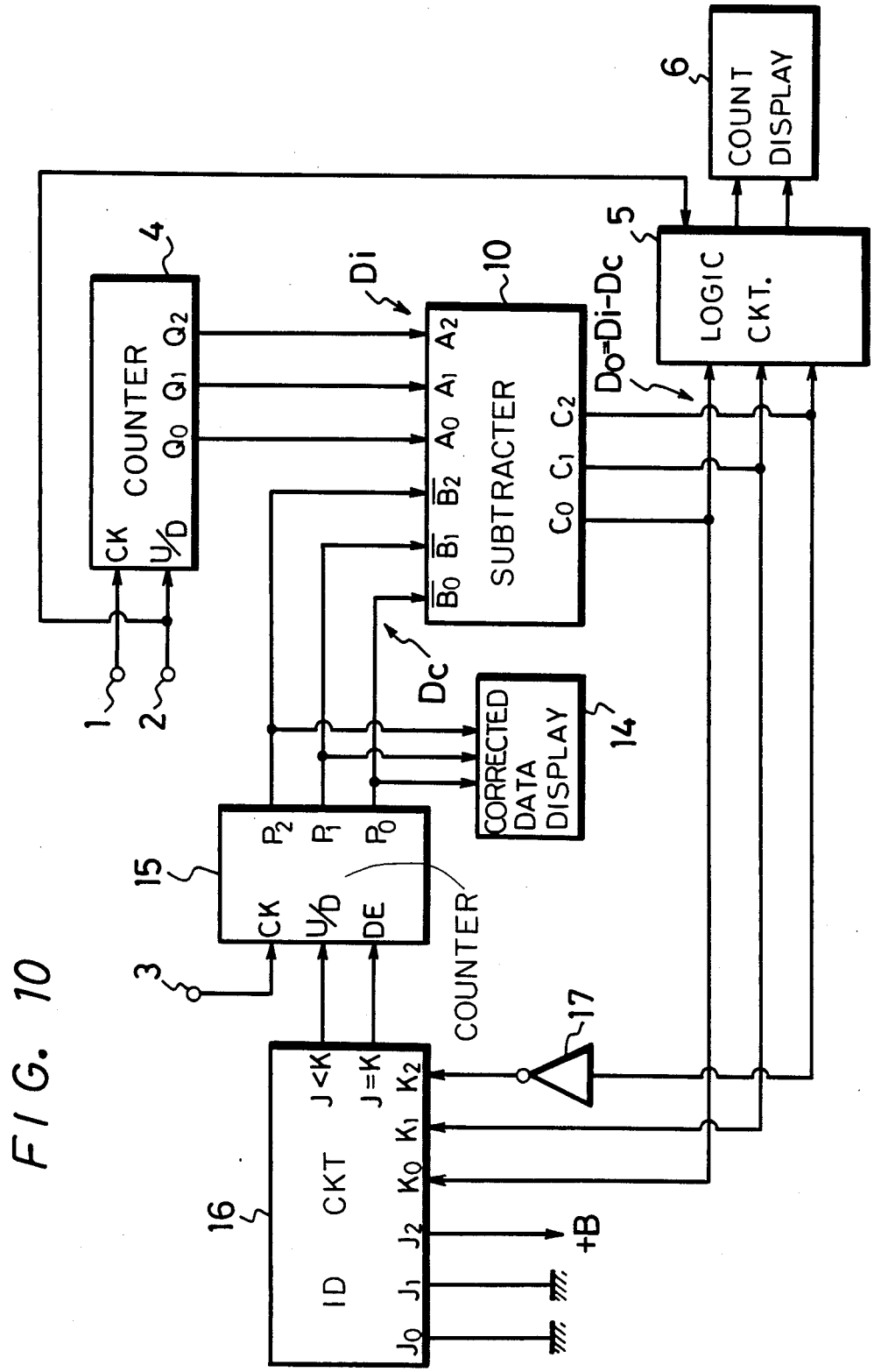
F I G. 10

TAPE POSITION DISPLAY APPARATUS USING COUNTER ROLLER PULSES AND CTL PULSES

BACKGROUND OF THE INVENTION

1. Field of the Invention

This invention relates to tape position display apparatus and, more particularly, to novel and highly-effective tape position display apparatus for use with a VTR (video tape recorder), an audio tape recorder and the like.

2. Description of the Prior Art

In the prior art, there are two basic types of tape position display apparatus. In one type of conventional tape position display apparatus, a roller is mounted in contact with a magnetic tape so that the roller rotates whenever the tape runs. A rotation detector detects rotation of the roller and produces detection pulses proportional to the rotation of the roller. A count display apparatus is driven by the detection pulses produced by the rotation detector thereby to display the instantaneous position of the tape (with respect, for example, to the magnetic head(s)). In the other type of conventional tape position display apparatus, a position signal (CTL signal) is recorded in a pattern that repeats at equal distances along an edge of the magnetic tape extending in its longitudinal direction. While the magnetic tape is transported, the position signal is reproduced therefrom by a magnetic head, and the count display is driven by detection pulses derived from the magnetic head thereby to display the instantaneous position of the tape.

The former conventional tape position display apparatus has the advantage that tape position detecting pulses of high reliability can be produced continuously. However, it has the drawback that, if the magnetic tape and the roller slip with respect to each other or the magnetic tape becomes slack, the detection accuracy of the tape position detecting pulses is reduced.

The latter conventional apparatus avoids the drawback of the former apparatus. However, if a dropout occurs in the playback of the position signal, the detection accuracy of the tape position detecting pulse is inevitably reduced.

There is also in the prior art a hybrid tape position display apparatus, which is formed of the combination of the two basic types of apparatus described above and which therefore improves the accuracy of the tape position detecting pulse (see a published, examined Japanese patent application No. 9504/1983).

However, such hybrid apparatus also has certain drawbacks. Specifically, as explained in greater detail below, it is impossible to determine whether or not the pulses that result from mechanically detecting the tape transport, and which give a first indication of the position of the tape, are out of phase (e.g., delayed) with respect to the pulses that result from reproducing the position signal recorded on the tape, and which refine the indication provided by the first-named pulses. It is also impossible to determine the magnitude of the phase difference, if any, between the two sets of pulses. Furthermore, if the phase difference between the first and second pulses could be determined and were large, the phase of the tape position detecting signal finally obtained would be suddenly and drastically changed by the second pulses.

OBJECTS AND SUMMARY OF THE INVENTION

An object of the invention is to provide a tape position display apparatus that solves the problems of the prior art outlined above and that, in particular, can detect and display the tape position (e.g., with respect to the magnetic head(s)) with high accuracy.

Another object of the invention is to provide a tape position display apparatus that can detect any phase difference of first pulses, which result from mechanically detecting the transport of the tape, relative to second pulses, which result from reproducing a position signal recorded on the tape.

Another object of the invention is to provide a tape position display apparatus in which, even when the phase difference between the first and second pulses is large, the phase of a tape position detecting signal finally obtained can be changed gradually.

According to one aspect of the present invention, there is provided a tape position display apparatus comprising: first generating means for generating first electrical pulses in response to transport of a tape; first counter means for making a first count of the first electrical pulses; second generating means for generating second electrical pulses from a control track signal recorded on tape in response to the transport thereof; second counter means for making a second count of the second electric pulses; subtracting means for detecting the difference between the first and second counts and producing a difference signal proportional thereto; comparing means for comparing the difference signal with a predetermined value and producing a compared result signal; the second counter means counting in a direction which is controlled by the compared result signal; and tape position display means responsive to the difference signal and producing a tape position display.

According to another aspect of the present invention, there is provided a tape position display apparatus comprising: first generating means for generating first electrical pulses in response to transport of a tape; counter means for counting the first electrical pulses and producing a count signal; second generating means for generating second electrical pulses from a control track signal recorded on the tape in response to the transport thereof; subtracting means having first input terminal means to which the count signal is supplied and second input terminal means and generating a difference signal; identifying circuit means for generating an identifying signal having one of three values in response to the difference signal; adding means having first input terminal means to which the identifying signal is supplied and second input terminal means and producing a sum signal; and latch circuit means having an input supplied with the sum signal and latching the same by the second electrical pulses and producing a latch output signal; and tape position display means responsive to the difference signal and producing a tape position display; the difference signal being shifted in response to the second electrical pulses, the tape position display being responsive to the difference signal, and the latch output signal being supplied to the second input terminal means of the subtracting means and to the second input terminal means of the adding means.

BRIEF DESCRIPTION OF THE DRAWINGS

A better understanding of the objects, features and advantages of the invention can be gained from a consideration of the following detailed description of the preferred embodiments thereof, in conjunction with the accompanying drawings, wherein like reference characters designate the same elements and parts, and wherein:

FIG. 1 is a circuit block diagram showing an example of a hybrid prior art tape position display apparatus combining the principal features of the two basic types of position display apparatus known in the prior art;

FIGS. 2A to 2H are respectively timing charts showing the operation of the prior art tape position display apparatus shown in FIG. 1;

FIGS. 6A to 6K are respectively timing charts showing the operation of the tape position display apparatus of FIG. 3;

FIG. 7 is a circuit block diagram showing another embodiment of tape position display apparatus according to the invention;

FIGS. 8A to 8N and FIGS. 9A to 9N are respectively timing charts showing the operation of the tape position display apparatus of FIG. 7; and FIG. 10 is a circuit block diagram showing another embodiment of tape position display apparatus according to the invention.

DESCRIPTION OF THE PREFERRED EMBODIMENTS

Figure 3:
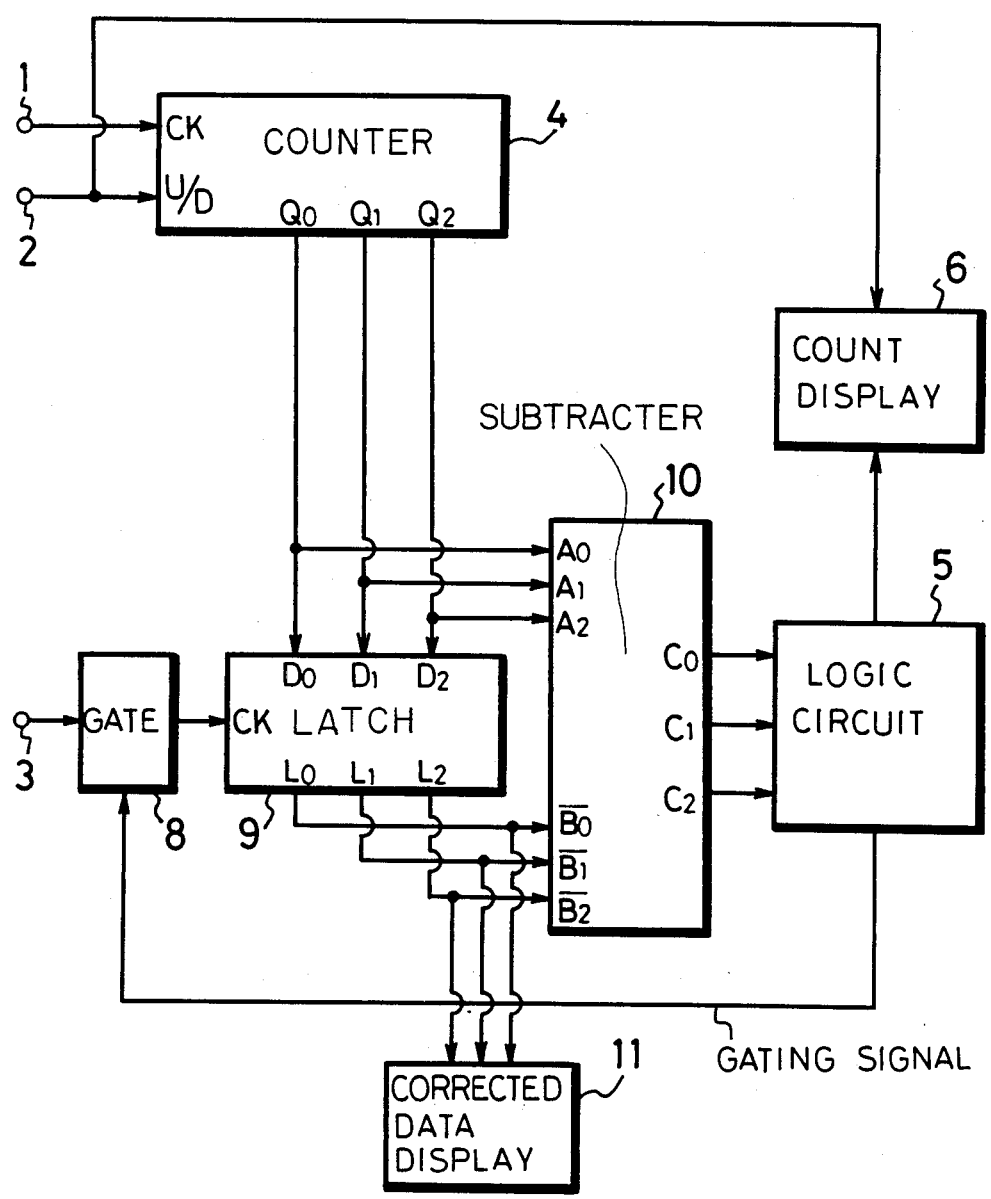
FIG. 3 is a circuit block diagram showing an embodiment of tape position display apparatus according to the present invention.

FIG. 1 shows the structure of the previously proposed tape position detecting apparatus which is a hybrid of the two basic types known in the prior art. While the published Japanese patent application mentioned above discloses the use of a modulo five counter, FIG. 1 shows a modulo eight (octal) counter for simplicity of explanation. In FIG. 1, an octal up/down counter 4 receives as an input first pulses resulting from mechanically detecting the transport of the tape. These pulses are received at an input terminal 1 and applied to the clock input terminal CK of the counter 4. A tape transport direction detecting signal resulting from mechanically detecting the transport of the tape is supplied to the up/down changeover signal input terminal U/D of the counter 4 through an input terminal 2.

In order to produce the signals supplied to the input terminals 1 and 2, a roller 20 (FIG. 4) that is in contact with the magnetic tape TP and rotated by the transport of the tape has a rotation detector attached thereto, and rotation pulses having a phase difference of 90° are supplied to the rotation detecting circuit. The rotation detecting circuit produces the first pulses and the tape transport direction detecting signal mentioned above.

A logic circuit 5 (FIG. 1) receives outputs $Q_2$, $Q_1$ and $Q_0$ from the counter 4 representing digits having respective values of $2^2$, $2^1$ and $2^0$. The logic circuit 5 produces a pulse once every cycle of the counter 4, which pulse is supplied to a count display 6. The logic circuit 5 also supplies to a reset/preset pulse generating circuit 7 a gating signal so as to remove noise. The count display 6 also receives the tape transport direction detecting signal supplied to the input terminal 2. The display 6 is arranged to display the tape position in terms of the hour, minute, second and frame (1/30 second).

The reset/preset pulse generating circuit 7 receives the tape transport direction detecting signal supplied to the input terminal 2 and second pulses supplied to the input terminal 3. The second pulses result from the transport of the tape and are gated by the gating signal from the logic circuit 5. The reset/preset pulse generating circuit 7 supplies the reset pulse and the preset pulse to the counter 4 on the basis of the input signals to the circuit 7.

The second pulses, applied to the input terminal 3, are the signals reproduced by the magnetic head from the position signal (CTL signal) recorded at equal intervals on the edge of the magnetic tape parallel to its longitudinal direction. The second pulses may, for example, have a frequency or repetition rate of 30 Hz when the magnetic tape is transported at a normal tape speed. The frequency of the first pulses, supplied to the input terminal 1, is selected to be 240 Hz (=30 Hz×8) when the tape is run at normal speed.

FIGS. 2A to 2H illustrate the operation of the prior art tape position detecting apparatus shown in FIG. 1.

First, let it be assumed that the second pulses, which are supplied to the input terminal 3, are neglected. Then, when the tape is transported in the positive (forward) direction and the counter 4 counts the first pulses in the positive direction, if the binary number is converted to a decimal number, the count in the counter 4 changes in the sequence 0, 1, 2, 3, 4, 5, 6, 7, 0, 1, 2, 3, . . ., as FIG. 2A shows. When on the other hand the tape is transported in the opposite (reverse) direction and the counter 4 counts the first pulses in the reverse direction, if the binary number is converted to a decimal number, the count in the counter 4 changes in the sequence 7, 6, 5, 4, 3, 2, 1, 0, 7, 6, . . . , as FIG. 2F shows.

The pulse supplied by the logic circuit 5 to the display 6 is generated when the count in the counter 4 changes from the maximum value to the minimum value and vice versa: i.e., when the most significant bit output $Q_2$ of the counter 4 changes in level from "1" to "0" or from "0" to "1".

The gating signal supplied by the logic circuit 5 to the reset/preset pulse generating circuit 7 and used to gate the second pulses (i.e., the pulses received at the terminal 3) has a high level when the count in the counter 4 lies in a range from, for example, 6 to 2 or 2 to 6 and a low level in other cases, as FIGS. 2A and 2B show.

The operation of the tape transport amount detecting apparatus of FIG. 1 is affected also by the second pulses, which are supplied to the input terminal 3. In the case where the magnetic tape is transported in the positive direction and the counter 4 counts the first pulses in the positive direction, as shown in FIG. 2D, when the count in the counter 4 is 7, if one of the second pulses (applied to the terminal 3) is produced (FIG. 2C), the reset pulse is supplied from the reset/preset pulse generating circuit 7 to the counter 4 so that the count in the counter 4 is changed from 7 to 0 (FIG. 2D). Thereafter, the count in the counter 4 is incremented in the order 1, 2, 3, . . . . . When the count in the counter 4 becomes 0, one of the second pulses (applied to the terminal 3) is generated again as shown in FIG. 2C but the count in the counter 4 is not changed thereby. Each time the count in the counter 4 is is changed from 7 to 0 (FIG. 2D), the count pulse (FIG. 2E) is generated by the logic circuit 5 and supplied to the display 6, in which the displayed count is incremented by 1.

In the case where the magnetic tape is transported in the opposite (reverse) direction and the counter 4 counts the first pulse in the reverse direction, as shown in FIG. 2G, when the count in the counter 4 is 2, if one of the second pulses (applied to the terminal 3) is generated as shown in FIG. 2C, the preset pulse is supplied from the circuit 7 to the counter 4 so that the count in the counter 4 is changed to 7 as shown in FIG. 2G. Thereafter, the count in the counter 4 is decremented in the order 6, 5, 4, . . . . When the count in the counter 4 becomes 7, one of the second pulses (applied to the terminal 3) is generated again as shown in FIG. 2C but the count in the counter 4 is not changed thereby. Each time the count in the counter 4 is changed from 2 to 7 or 0 to 7 (FIG. 2G), the count pulse (FIG. 2H) is generated by the logic circuit 5 and supplied to the display 6, in which the displayed count is decremented by 1.

In the tape position detecting apparatus shown in FIG. 1, since the count in the counter 4, which counts the first pulses (applied to the terminal 1), is changed by the second pulses in the manner described above, it is possible to detect the tape position with high accuracy. However, in the prior art apparatus, it is impossible to determine whether or not the first pulses, which are applied to the terminal 1 and result from mechanically detecting the tape transport, are out of phase (e.g., delayed) with respect to the second pulses, which are applied to the terminal 3 and result from reproducing the position signal recorded on the tape. It is also impossible to determine the magnitude of the phase difference therebetween, if any. Furthermore, if the phase difference between the first and second pulses could be determined and were large, the phase of the tape position detecting signal finally obtained would be suddenly and drastically changed by the second pulses.

FIG. 3 shows a first preferred embodiment of a tape position display apparatus according to the present invention. In FIG. 3, an up/down counter 4 of, for example, octal (modulo eight) type receives first pulses, which result from mechanically detecting the transport of the tape past the magnetic head(s), on an input terminal 1. The pulses received on the terminal 1 are applied to a clock input terminal CK of the counter 4. A tape transport direction detecting signal, which results from mechanically detecting the transport of the tape past the head(s), is applied through an input terminal 2 to an up/down switching signal input terminal U/D of the counter 4.

Figure 4:
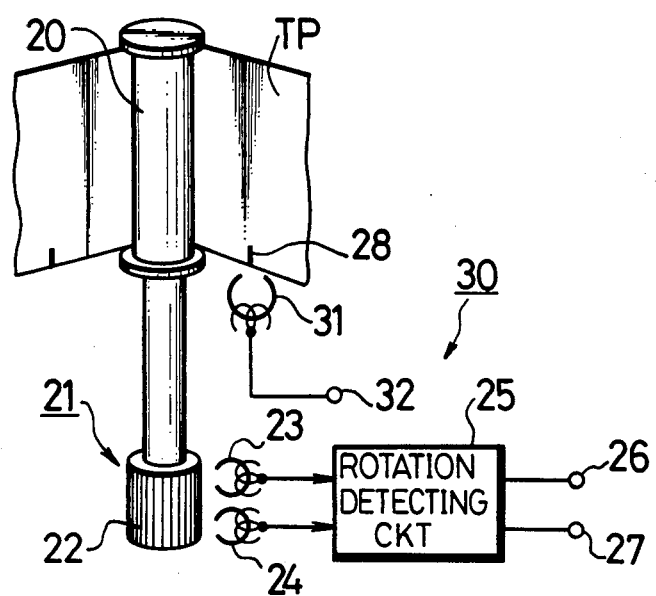
FIG. 4 is a diagram showing pulse generating means for generating two series of pulses that are processed by the apparatus of FIG. 3 in accordance with the invention.
Figure 5A:
FIGS. 5A to 5D are respectively timing charts showing the operation of the pulse generating means of FIG. 4A.
Figure 5B:
Figure 5C:
Figure 5D:

The signals supplied to the input terminals 1 and 2 are generated by a first pulse generating means 30, shown in FIG. 4. In FIG. 4, a roller 20 in contact with a magnetic tape TP is rotated in accordance with the transport of the tape. The roller 20 is connected to a rotation detector 21 (formed of a rotation magnet 22, which is attached through a shaft to the roller 20, and magnetic heads 23 and 24). First and second rotation pulses (see FIGS. 5A and 5B) having a phase difference of 90° therebetween are generated by the magnetic heads 23 and 24 and supplied to a rotation detecting circuit 25. The rotation detecting circuit 25 produces a first pulse of 240 Hz (FIG. 5C) corresponding to the leading and trailing edges of the rotation pulses (FIGS. 5A and 5B) and a tape transport direction detecting signal (FIG. 5D).

As FIG. 3 shows, a latch circuit 9 receives outputs $Q_2$, $Q_1$ and $Q_0$ respectively representing the digits $2^2$, $2^1$ and $2^0$ as inputs $D_2$, $D_1$ and $D_0$ thereof from the counter 4 and latches them by the second pulses supplied thereto from an input terminal 3 through a gate circuit 8. The second pulses (30 Hz) are obtained by reproducing by a second pulse generating means (fixed magnetic head) 31 a position signal (CTL signal) 28 that is recorded along the longitudinal edge of the tape TP. Successive signals 28 are recorded in a direction parallel to the longitudinal direction of the tape, as FIG. 4 shows.

A subtracter 10 (FIG. 3) is formed of a full-adder, to which the outputs $Q_2$, $Q_1$ and $Q_0$ of the counter 4 respectively representing the digits $2^2$, $2^1$, and $2^0$ are supplied at its inputs $A_2$, $A_1$, and $A_0$ and the outputs $L_2$, $L_1$, $L_0$ of the latch circuit 9 respectively representing the digits $2^2$, $2^1$ and $2^0$ are supplied at its inputs $\overline{B_2}$, $\overline{B_1}$, $\overline{B_0}$. The inputs at $\overline{B_2}$, $\overline{B_1}$, $\overline{B_0}$ are substracted from the inputs at $A_2$, $A_1$, $A_0$.

A logic circuit 5 receives outputs $C_2$, $C_1$ and $C_0$ of the subtracter 10, respectively representing the digits $2^2$, $2^1$ and $2^0$, and produces one pulse at every one cycle of the counter 4 and supplies it to a count display 6. Also, the logic circuit 5 supplies a gating signal to the gate circuit 8 for the purpose of removing noise. The count display 6 receives the tape transport direction detecting signal from the input terminal 2. The count display 6 displays the tape position in the form of the hour, minute, second and frame (1/30 second).

A corrected data display or phase difference display means 11 receives the latch outputs ($L_0$, $L_1$ and $L_2$) of the latch circuit 9 and thereby displays the corrected data or phase difference.

FIGS. 6A to 6K show the operation of the tape position display apparatus of FIG. 3.

When the tape is transported in the positive direction and the counter 4 counts one of the first pulses, if the binary number is converted to a decimal number, in the positive direction, the count in the counter 4 is changed in the sequence 0, 1, 2, 3, 4, 5, 6, 7, 0, 1, 2, 3 . . . , as FIG. 6A shows. When the tape is transported in the opposite (reverse) direction and the counter 4 counts one of the first pulses, if the binary number is changed to a decimal number, in the opposite direction, the count in the counter 4 is changed in the sequence 7, 6, 5, 4, 3, 2, 1, 0, 7, 6, . . . , as FIG. 6G shows.

The pulse supplied by the logic circuit 5 to the count display 6 is produced when the count in the counter 4 is changed in either direction between the maximum and the minimum, or when the value of the most significant output $Q_2$ of the counter 4 is changed from "1" to "0" or from "0" to "1".

The gate signal (which gates the second pulses) supplied by the logic circuit 5 to the gate circuit 8 is a signal which becomes high (FIG. 6E) when the count in the counter 4 lies in a range from, for example, 6 to 2 or 2 to 6 and which becomes low in other cases.

In the case where the tape is transported in the positive direction and the counter 4 counts the first pulse in the positive direction as shown in FIG. 6A, when the count in the counter 4 is 7, if the second pulse is generated as shown in FIG. 6B, the count of 7 is latched in the latch circuit 9 as shown in FIG. 6C. Since in the subtracter 10 the value 7 is subtracted sequentially from the count in the counter 4, the output of the subtracter 10 becomes as shown in FIG. 6D. Then, as shown in FIG. 6F by the solid line, when the output from the subtracter 10 is changed from 6 to 0 and from 7 to 0, the logic circuit 5 generates pulses which are then supplied to the count display 6 to increment its display one by one. FIG. 6E shows the gating signal supplied by the logic circuit 5 to the gate circuit 8.

When the count in the counter 4 is changed from 7 to 0, as shown by broken lines in FIG. 6F, a pulse is produced by the logic circuit 5 and supplied to the count display 6, which then increments one by one the value of the display thereof.

In the case where the tape is transported in the opposite (reverse) direction and the counter 4 counts the first pulses in the opposite direction as shown in FIG. 6G, when the count in the counter 4 is 1, if the second pulses are produced as shown in FIG. 6B, the count of 1 is latched in the latch circuit 9 as shown in FIG. 6H. Then, since 1 is subtracted sequentially from the count in the counter 4 by the subtracter 10, the output of the subtracter 10 becomes as shown in FIG. 6I. When the output from the subtracter 10 is changed from 0 to 7, as shown by the solid lines in FIG. 6K, the pulse is produced from the logic circuit 5 and supplied to the count display 6, in which the value of the display is decremented one by one. FIG. 6J shows the gating signal that is supplied from the logic circuit 5 to the gate circuit 8 in this case.

When the count in the counter 4 is changed from 0 to 7, as shown by the broken line in FIG. 6K, the pulse is generated from the logic circuit 5 and then supplied to the count display 6, in which the value of the display is decremented one by one.

Accordingly, the count display 6 displays the tape position as determined by counting of the first pulses and making a correction in accordance with the second pulses.

It is sufficient that the frequency of the first pulses be selected to be higher than three times the frequency of the second pulses. Preferably, the frequency of the first pulses should be $2^n$ ($n=2, 3, 4, \ldots$) times the frequency of the second pulses, since the counter and the logic circuits can then be simplified.

FIG. 7 shows another embodiment of the tape position display apparatus according to the present invention. In FIG. 7, parts corresponding to those of FIG. 3 are marked with the same references and are not further described. An up/down counter 4 of, for example, octal type receives the first pulses, which result from mechanically detecting the transport of the tape, from an input terminal 1. The pulses received from the terminal 1 are applied to the clock input terminal CK of the counter 4. The tape transport direction detecting signal, which results from mechanically detecting the transport of the tape, is supplied from an input terminal 2 to an up/down switching signal input terminal U/D of the counter 4.

The latch circuit 9 receives outputs $I_2$, $I_1$, $I_0$ which are generated by an adder 12 and respectively represent the digits $2^2$, $2^1$, $2^0$. These outputs are supplied as inputs $D_2$, $D_1$, $D_0$ to the latch circuit 9, which latches them by the second pulses applied to its clock input terminal CK from the input terminal 3.

The subtracter 10 receives the output Di ($Q_2$, $Q_1$, $Q_0$) of the counter 4 representing the digits $2^2$, $2^1$, $2^0$ and the output Dc ($L_2$, $L_1$, $L_0$) of the latch circuit 9 representing the digits $2^2$, $2^1$, $2^0$ and subtracts the latter from the former.

An identifying circuit 13 receives the outputs $D_0$ ($C_2$, $C_1$, $C_0$) of the subtracter 10 representing the digits $2^2$, $2^1$, and $2^0$ and the tape transport direction detecting signal from the input terminal 2. When the tape TP (FIG. 4) is transported in the positive direction, if the output $D_0$ of the subtracter 10 is advanced in phase to any one of 1, 2 and 3, $+a=-1$ is obtained as an output Du; if the output $D_0$ is retarded in phase to any one of 4, 5, 6 and 7, $-a=-1$ is obtained as the output Du; and if the output $D_0$ of the subtracter 10 is zero (i.e., is neither advanced nor retarded in phase), 0 is obtained as the output Du. When the tape TP (FIG. 4) is transported in the opposite (reverse) direction, if the output $D_0$ of the subtracter 10 is advanced in phase to any one of 1, 2 and 3, $+a=+1$ is obtained as the output Du; if the output $D_0$ is delayed in phase to any one of 4, 5 and 6, $-a=-1$ is obtained as the output Du; and if the output $D_0$ is 0 or 7 (i.e., is neither advanced nor retarded in phase), 0 is obtained as the output Du, and a may be selected to be more than 2 or may be changed in accordance with the value of the output $D_0$.

The adder 12 receives the output Dc of the latch circuit 9 and the output Du of the identifying circuit 13 and produces an added output $D_N$ ($I_2$, $I_1$, $I_0$). This output $D_N$ is supplied to the latch circuit 9 and then latched therein by the second pulses from the input terminal 3.

The subtracter 10, the identifying circuit 13 and the adder 12 can be formed of a ROM (read only memory).

As FIG. 7 shows, in this embodiment, the logic circuit 5 receives the output ($C_2$, $C_1$, $C_0$) of the subtracter 10 representing the digits $2^2$, $2^1$, and $2^0$ and the tape transport direction detecting signal from the input terminal 2. The logic circuit 5 produces square wave signals having a phase difference of 90° at every cycle of the counter 4. The square wave signals are delivered from the logic circuit 5 to the count display 6. The count display 6 displays the tape position in terms of the hour, minute, second and frame (1/30 second). A corrected data display or phase difference display means 14 receives the latch output ($L_2$, $L_1$, $L_0$) from the latch circuit 9 and thereby displays the corrected data or phase difference.

The timing charts of FIGS. 8A to 8N and 9A to 9N illustrate the operation of the tape position display apparatus shown in FIG. 7.

FIGS. 8A to 8N are respectively timing charts showing a case in which the tape TP of FIG. 4 is transported in the positive direction. FIGS. 8A to 8G show a case in which the phase of the output $D_0$ of the subtracter 10 (FIG. 7) is advanced relative to the second pulses (the second pulses are represented as $P_2$ in FIG. 8F), while FIGS. 8H to 8N show a case in which the phase of $D_0$ is delayed relative to the second pulses. In FIGS. 8G and 8N, reference letter X designates a pair of tape position detecting signals that are supplied from the logic circuit 5 to the count display 6 (FIG. 7). Each of these signals is a square wave signal having a duty ratio of 50% in the normal mode and high when the signal $D_0$ changes from 3 to 4 and becomes low when the signal $D_0$ changes from 7 to 0. Although the other tape position detecting signals are not shown, each of them is derived by advancing the phase of the signal X by 90° when the tape TP is transported in the positive direction.

As FIGS. 8B, 8C, 8E and 8F show, when $D_0=3$, if the second pulse $P_2$ is produced, the latch circuit 9 latches $D_N=0$ to thereby produce the output Dc=0. Then, since Dc=0 is subtracted from Di=2 in the subtracter 10, the output Do is decreased by 1 (from 3 to 2) immediately. That is, in clock arithmetic, modulo eight, $2-7=3$, whereas $2-0=2$.

As FIGS. 8B, 8C, 8E and 8F also show, when $D_0=2$, if the second pulse $P_2$ is produced, the latch circuit 9 latches $D_N=1$ to thereby produce the output $Dc=1$. Then, since $Dc=1$ is subtracted from $Di=2$ in the subtracter 10, the output $D_0$ is decreased by 1 (from 2 to 1) immediately.

Further, as FIGS. 8B, 8C, 8E and 8F show, when $D_0=1$, if the second pulse $P_2$ is generated, the latch circuit 9 latches $D_N=2$ and hence $D_C=2$ is obtained therefrom. Since in the subtracter 10 $Dc=2$ is subtracted from $Di=2$, the output $D_0$ is decreased by 1 (from 1 to 0) and coincides in phase with the second pulse $P_2$. In this case, of course, even if thereafter the second pulse $P_2$ is produced when $D_0=0$, the output $D_0=0$ is not changed at all.

As FIGS. 8I, 8J, 8L and 8M show, when $D_0=5$, if the second pulse $P_2$ is produced, the latch circuit 9 latches $D_N=4$ thereby to produce the output $Dc=4$. Then, since $Dc=4$ is subtracted from $Di=2$ in the subtracter 10, the output $D_0$ is increased by 1 (from 5 to 6) immediately. (In clock arithmetic, modulo eight, $2-4=6$.)

As FIGS. 8I, 8J, 8L and 8M show, when $D_0=6$, if the second pulse $P_2$ is produced, the latch circuit 9 latches $D_N=3$ thereby to produce the output $Dc=3$. Then, since $Dc=3$ is subtracted from $Di=2$ by the subtracter 10, the output $D_0$ is increased by 1 (from 6 to 7) immediately. (In clock arithmetic, modulo eight, $2-3=7$.)

As FIGS. 8I, 8J, 8L and 8M show, when $D_0=7$, if the second pulse $P_2$ is produced, the latch circuit 9 latches $D_N=2$ thereby to produce the output $Dc=2$. Then, since $Dc=2$ is subtracted from $Di=2$ by the subtracter 10, the output $D_O$ is increased by 1 (from 7 to 0) immediately and coincides in phase with the second pulse $P_2$. (In clock arithmetic, modulo eight, $7+1=0$.)

FIGS. 9A to 9N are timing charts showing the operation of the apparatus of FIG. 7 when the tape TP is transported in the opposite (reverse) direction. FIGS. 9A to 9G show the case in which the output $D_0$ of the subtracter 10 is advanced in phase relative to the second pulse $P_2$, while FIGS. 9H to 9N show the case in which the output $D_0$ of the subtracter 10 is delayed in phase relative to the second pulse $P_2$. In FIGS. 9G and 9N, reference letters X respectively designate a pair of tape position detecting signals that are supplied from the logic circuit 5 to the count display 6. Each of the tape position detecting signals is a square wave signal having a duty ratio of 50% in the normal mode and becomes high when the output $D_0$ changes from 0 to 7 and low when the output $D_0$ changes from 4 to 3. Although the other tape position detecting signals are not shown, when the tape TP is transported in the opposite (reverse) direction, each of them is derived by delaying the phase of the signal X by 90°.

As FIGS. 9B, 9C, 9E and 9F show, when $D_0=4$, if the second pulse $P_2$ is produced, the latch circuit 9 latches $D_N=0$ to thereby produce the output $Dc=0$. Then, $Dc=0$ is subtracted from $Di=5$ in the subtracter 10, so that the output $D_0$ is increased by 1 (from 4 to 5) immediately.

As FIGS. 9B, 9C, 9E and 9F also show, when $D_0=5$, if the second pulse $P_2$ is produced, the latch circuit 9 latches $D_N=6$ thereby to produce an output $Dc=7$. Then, $Dc=7$ is subtracted from $Di=5$ in the subtracter 10 so that the output $D_0$ is increased by 1 (from 5 to 6) immediately. (In clock arithmetic, modulo eight, $5-7=6$.)

As FIGS. 9B, 9C, 9E and 9F also show, when $D_0=6$, if the second pulse $P_2$ is produced, the latch circuit 9 latches $D_N=6$ thereby to produced an output $Dc=6$. Then, $Dc=6$ is subtracted from $Di=5$ by the subtracter 10 so that the output $D_0$ is increased by 1 (from 6 to 7) immediately and coincides in phase with the second pulse $P_2$. (In clock arithmetic, modulo eight, $5-6=7$.)

As FIGS. 9I, 9J, 9L and 9M show, when $D_0=2$, if the second pulse $P_2$ is produced, the latch circuit 9 latches $D_N=4$ thereby to produce an output $Dc=4$. Then, $Dc=4$ is subtracted from $Di=5$ by the subtracter 10, so that the output $D_O$ is decreased by 1 (from 2 to 1) immediately.

FIGS. 9I, 9J, 9L and 9M also show, when $D_0=1$, if the second pulse $P_2$ is produced, the latch circuit 9 latches $D_N=5$ thereby to produce an output $Dc=5$. Then, $Dc=5$ is subtracted from $Di=5$ by the subtracter 10, so that the output $D_0$ is decreased by 1 (from 1 to 0) and coincides in phase with the second pulse $P_2$.

As indicated above, even if the phase difference between the output $D_0$ from the subtracter 10 and the second pulse $P_2$ is large, such phase difference is gradually decreased each time the second pulse $P_2$ occurs. Thus when the tape transport direction detecting signals with the phase difference of 90° containing information regarding the tape transport direction are produced by the logic circuit 5 and then supplied to the count display 6, there need be no concern that a malfunction will occur in the count display 6. A count display 6 of this kind, which receives two square wave signals having a phase difference of 90° therebetween and containing the tape transport direction information and displays the count value, will function incorrectly if the phase of the tape position detecting signals changes considerably.

Even if noise is mixed into the second pulse $P_2$, the output $D_0$ from the subtracter 10 tends to be stable. The operation of the tape position display apparatus is therefore little affected by the noise.

FIG. 10 shows a further embodiment of the tape position display apparatus according to the invention. In FIG. 10, parts corresponding to those of FIG. 7 are marked with the same references and are not described in detail.

A counter 15 in FIG. 10 has a clock terminal CK to which the second pulses $P_2$ are supplied from the terminal 3. The output Dc ($R_2$, $R_1$ $R_0$) of the counter 15 representing the digits $2^2$, $2^1$ and $2^0$ is supplied to the subtracter 10, in which it is subtracted from the output Di ($Q_2$, $Q_1$, $Q_0$) of the counter 4. An identifying circuit 16 receives a signal $C_2$, $C_1$, $C_0=K(K_2, K_1, K_0)$ resulting from phase-inverting the MSB (most significant bit) of the output $D_O(C_2, C_1, C_0)$ from the subtracter 10 by an inverter 17. The identifying circuit 16 compares the signal $K(K_2, K_1, K_0)$ with a reference signal $J(J_2, J_1, J_0)(=$"100" (binary notation)$=4$ (decimal notation)). In this case, $K=D_0+4$ is established. The up/down counter 15 for counting the second pulse $P_2$ from the terminal 3 is controlled by the output from the identifying circuit 16. To be more concrete, when $J<K$, the counter 15 is operated in the up-count mode, while when $J=K$, the counter 15 stops its count operation.

FIGS. 8A to 8N and 9A to 9N illustrate the operation of the tape position display apparatus of FIG. 10. In these figures, Di represents the output from the counter 4, Dc represents the output from the counter 15, and $D_0$ represents the output form the subtracter 10.

First the operation of the tape position display apparatus in a case in which the tape TP (FIG. 4) is transported in the positive direction will be considered. As FIGS. 8A, 8B, 8C and 8F show, when $D_0=3$, if the second pulse $P_2$ is produced, the counter 15 is set in the up-mode because $K=7$ so that the output Dc from the counter 15 is changed from 7 to 0. Thus $Dc=0$ is subtracted from $Di=2$ in the subtracter 10 so that the output Do is decreased by 1 (from 3 to 2) immediately.

As FIGS. 8A, 8B, 8C and 8F show, when $D_0=2$, if the second pulse $P_2$ is produced, the counter 15 is set in the up-mode because $K=6$ so that the output Dc from the counter 15 is changed from 0 to 1. Thus $Dc=1$ is subtracted from $Di=2$ in the subtracter 10 so that the output $D_O$ is decreased by 1 (from 2 to 1) immediately.

As FIGS. 8A, 8B, 8C and 8F also show, when $D_0=1$, if the second pulse $P_2$ is produced, the counter 15 is set in the up-mode since $K=5$ so that the output Dc from the counter 15 is changed from 1 to 2. Thus $Dc=2$ is subtracted from $Di=2$ in the subtracter 10 so that the output $D_0$ is decreased by 1 (from 1 to 0) and coincides in phase with the second pulse $P_2$. Thereafter, even if the second pulse $P_2$ is produced when $D_0=0$, $K=4$ is established so that the output Dc from the counter 15 remains unchanged and thus $D_0=0$ also remains unchanged.

As FIGS. 8H, 8I, 8J and 8M show, when $D_0=5$, if the second pulse $P_2$ is produced, the counter 15 is set in the down-mode since $K=1$, so that the output Dc from the counter 15 is changed from 5 to 4, whereby $Dc=4$ is subtracted from $Di=2$ in the subtracter 10. The output $D_0$ is immediately increased by 1 (from 5 to 6). (In clock arithmetic, modulo eight, $2-4=6$.)

As FIGS. 8H, 8I, 8J and 8M show, when $D_0=6$, if the second pulse $P_2$ is produced, the counter 15 is set in the down-mode since $K=2$, so that the output Dc from the counter 15 is changed from 4 to 3, whereby $Dc=3$ is subtracted from $Di=2$ in the subtracter 10. The output $D_O$ is immediately increased by 1 (from 6 to 7). (In clock arithmetic, modulo eight, $2-3=7$.)

As FIGS. 8H, 8I, 8J and 8M also show, when $D_0=7$, if the second pulse $P_2$ is produced, the counter 15 is set in the down-mode since $K=3$, so that the output Dc from the counter 15 is changed from 3 to 2, whereby $Dc=2$ is subtracted from $Di=2$ in the subtracter 10. The output $D_O$ is immediately increased by 1 (from 7 to 0) and coincides in phase with the second pulse $P_2$. (In clock arithmetic, modulo eight, $7+1=0$.)

Next an explanation will be given of the operation of the tape position display apparatus in a case in which the tape TP (FIG. 4) is transported in the opposite (reverse) direction. As FIGS. 9A, 9B, 9C and 9F show, when $D_0=4$, if the second pulse $P_2$ is produced, the counter 15 is set in the down-mode since $K=0$, so that the output Dc from the counter 15 is changed from 1 to 0, whereby $Dc=0$ is substracted from $Di=5$ in the subtracter 10. The output $D_O$ is immediately increased by 1 (from 4 to 5).

As FIGS. 9A, 9B, 9C and 9F show, when $D_0=5$, if the second pulse $P_2$ is produced, the counter 15 is set in the down-mode since $K=1$, so that the output Dc from the counter 15 is changed from 0 to 7, whereby $Dc=7$ is subtracted from $Di=5$ in the subtracter 10. The output $D_O$ is immediately increased by 1 (from 5 to 6). (In clock arithmetic, modulo eight, $5-7=6$.)

As FIGS. 9A, 9B, 9C and 9F show, when $D_0=6$, if the second pulse $P_2$ is produced, the counter 15 is set in the down-mode since $K=2$, so that the output Dc from the counter 15 is changed from 7 to 6, whereby $Dc=6$ is subtracted from $Di=5$ in the subtracter 10. The output $D_O$ is immediately increased by 1 (from 6 to 7) and coincides in phase with the second pulse $P_2$. (In clock arithmetic, modulo eight, $5-6=7$.)

As FIGS. 9H, 9I, 9J and 9M show, when $D_0=2$ if the second pulse $P_2$ is produced, the counter 15 is set in the up-mode since $K=6$, so that the output Dc from the counter 15 is changed from 3 to 4, whereby $Dc=4$ is subtracted from $Di=5$ in the subtracter 10. The output $D_O$ is thus immediately decreased by 1 (from 2 to 1).

As FIGS. 9H, 9I, 9J and 9M also show, when $D_0=1$, if the second pulse $P_2$ is produced, the counter 15 is set in the up-mode since $K=5$, so that the output Dc from the counter 15 is changed from 4 to 5, whereby $Dc=5$ is subtracted from $Di=5$ in the subtracter 10. The output $D_0$ is thus immediately decreased by 1 (from 1 to 0) and coincides in phase with the second pulse $P_2$.

The tape position display apparatus shown in FIG. 10 may be modified so that the counter 15 is a $2^4$-scale counter having outputs $R_3$, $R_2$, $R_1$, $R_0$ respectively representing digits $2^3$, $2^2$, $2^1$, $2^0$. The outputs $R_3$, $R_2$, $R_1$ (Dc) of the most significant three digits are supplied to the subtracter 10. As a result, it requires two second pulses $P_2$ supplied to the counter 15 to change the outputs $R_3$, $R_2$, $R_1$, so that the phase of the output $D_0$ from the subtracter 10 changes more slowly. If the scale of the counter 15 is selected to be more than $2^5$ and the outputs of three higher digits are fed to the subtracter 10, the phase of the output $D_0$ from the subtracter 10 changes much more slowly.

Thus there is provided in accordance with the invention a tape position display apparatus particularly adapted for use with a VTR, an audio tape recorder and the like. The tape position display apparatus of the invention can detect and display the tape position with high accuracy.

Many modifications of the preferred embodiments of the invention will readily occur to those skilled in the art upon consideration of this disclosure. The invention is therefore limited only by the appended claims.

What is claimed is:

1. Tape position display apparatus comprising:
   first generating means for generating first electrical pulses in response to transport of a tape;
   counter means for making a count of said first electrical pulses;
   second generating means for generating, in response to said transport, second electrical pulses from a control track signal recorded on said tape, said first electrical pulses normally occurring at a frequency which is an integral multiple of the frequency of said second electrical pulses;
   means including a subtracter responsive to said count for producing an output representative of a modular count, for detecting a phase difference between a particular value of said modular count and a particular one of said second pulses, and for making adjustments in the value of said modular count, each such adjustment being independent of the magnitude of said phase difference and in such a direction as to reduce said magnitude; and
   tape position display means for displaying tape position in partial dependence on the value of said modular count.

2. Apparatus according to claim 1; wherein said means including a subtracter adjusts the value of said modular count in increments of one whole number.

3. Apparatus according to claim 1; wherein the frequency of said first electrical pulses is more than 3 times the frequency of said second electrical pulses.

4. Apparatus according to claim 1; wherein the frequency of said first electrical pulses is $2^n$ times the frequency of said second electrical pulses, n being an integer greater than 1.

5. Apparatus according to claim 1; further comprising phase difference display means for displaying said phase difference.

* * * * *